June 23, 1964     A. G. HUBNER     3,138,137
SCALE PLATE MOUNTING MEANS
Filed May 28, 1962
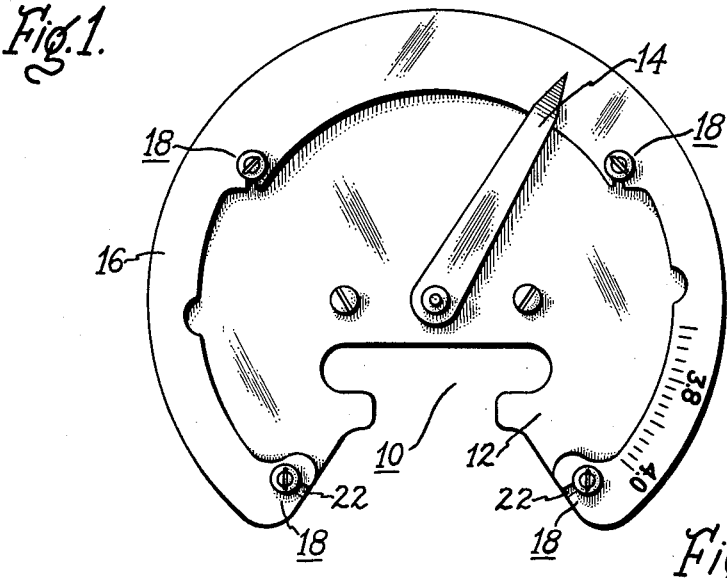
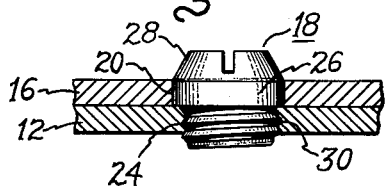
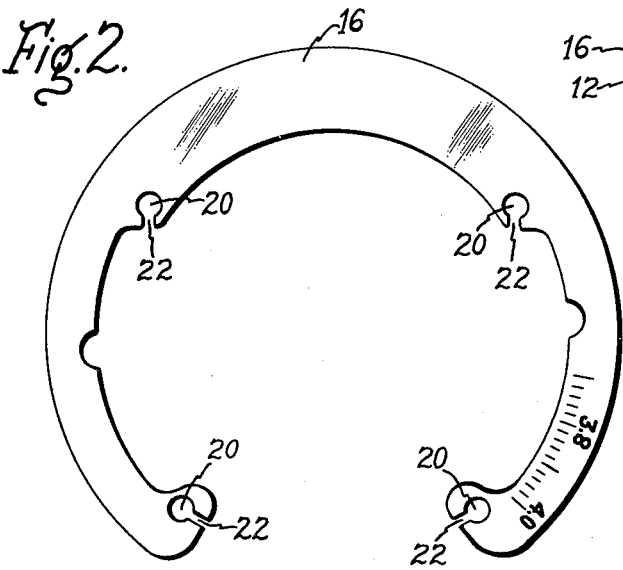
Inventor,
Alvah G. Hubner,
by Francis K. Doyle
His Attorney.

United States Patent Office 3,138,137
Patented June 23, 1964

3,138,137
SCALE PLATE MOUNTING MEANS
Alvah G. Hubner, Nottingham, N.H., assignor to General Electric Company, a corporation of New York
Filed May 28, 1962, Ser. No. 198,138
2 Claims. (Cl. 116—129)

This invention relates to scale plate mounting means, and more particularly to a means for mounting a dual class scale plate.

In the metering art, and especially in demand metering, a great variety of scale plates are used. This variety of scale plates is required because of the many types of demand which must be metered or registered by a demand meter. As is well known, many demand meters or registers are provided with means for operating at different classes or different levels of demand. One such type of a dual range demand meter or register is disclosed in application Serial No. 117,904, filed June 19, 1961 for Dual Range Demand Register in the name of M. M. Valley et al. and assigned to the same assignee as this invention.

Where a meter or register is capable of operating at two separate levels of demand or two classes of demand, it is required that different scale plates be used for each class of demand. In many of these meters a dual scale plate is provided. A dual scale plate is one in which each side of the scale plate is provided with numerical markings, each of which is for a different level of operation. When the level of the demand changes, it is then necessary to reverse the dual class scale plate to utilize the opposite side for the new demand level. This is usually done by removing the mounting screws which hold the scale plate to the meter. The scale plate is then reversed and the screws are replaced to again secure the scale plate to the meter.

Of course, it will be clear that since the mounting screws are extremely small it is very difficult to remove and replace these screws without dropping them. Further, since the screws are so small, it is very difficult to maintain the scale plate in the proper position, lined up with the mounting holes while replacing the screws. It will be understood that when the screws are dropped, due to their small size, they tend to be lost. This creates a problem where a meter repair man is replacing or reversing the scale plate, inasmuch as it requires that the repair man maintain an adequate supply of mounting screws to replace those which become lost during reversal or replacement of the scale plate. From the above it will be clear that it is desirable to provide a reversible scale plate which may be reversed without the removal of the small mounting screws.

Another known type of scale plate reversal means is one which utilizes key hole slots in the scale plate. In this type of meter, the mounting screws are loosened and the plate is then shifted so as to provide the large part of the key hole slot over the screw. The scale plate may then be removed, reversed, then replaced over the mounting screws and then shifted to the smaller part of the key hole slot. The screws are then tightened to maintain the scale plate in the desired position on the meter. As will be clear, the use of this type of key hole slot requires loosening of the screws, and again, due to the small size of these screws it is easy to accidentally remove them during the loosening operation. Further, as is well known, the shifting of the scale plate across the meter tends to scratch the scale on the reverse side of the scale plate making it difficult to read the markings on the scratched scale. Thus it is desirable that a reversible scale plate be provided which does not require loosening of mounting screws and shifting of the plate, as well as one which can be utilized without removing the mounting screws.

Further, as is well known, many times when the electrical service of a given establishment is being up rated this changes the class of the service required. In such instances it is normally only required that a new scale plate be provided for the meter without changing the meter itself. In these instances it is also desirable to have a replaceable scale plate which may be readily removed from the meter and replaced with another type of scale plate without loosening or removing screws or sliding of the plate on the register.

It is, therefore, one object of this invention to provide a novel means for securing a scale plate to a meter.

A further object of this invention is to provide a novel securing means to secure a scale plate to a meter which does not require removal of mounting screws.

A still further object of this invention is to provide a novel securing means for securing a scale plate to a meter which does not require loosening of mounting screws or shifting of the scale plate to remove the scale plate from the meter.

Briefly, this invention in a preferred form comprises a scale plate for use with a meter. The scale plate is provided with mounting holes, each hole having a slot extending from the edge of the mounting hole to the edge of the scale plate. Taper headed screws are provided on the meter, each screw head having a straight base portion and a sloped or tapered top portion. The scale plate is pressed over the tapered heads, the slots extending from the mounting holes cooperating with the mounting holes allowing each mounting hole to spring open over the tapered portion and tightly grip the straight portion of the screw head.

The invention which is desired to be protected will be particularly pointed out and distinctly claimed in the claims appended hereto. However, it is believed that a better understanding of this invention will be obtained from the following detailed description of a preferred embodiment thereof. From this description it will be clear how the various objects and advantages of this invention are obtained. The detailed description will be with reference to the drawing attached hereto in which:

FIGURE 1 is a front view of a meter showing one form of scale plate, according to this invention, mounted thereon;

FIGURE 2 is a front view of the form of scale plate shown in FIG. 1; and

FIGURE 3 is a partial sectional view of a preferred mounting showing one form of tapered screw of this invention.

Reference will now be made to the drawing, in which like numerals are used to indicate like parts throughout the various views thereof. In the drawing there is shown one form of the novel scale plate mounting means of this invention in which the scale plate is pressed on the meter over taper headed screws, the scale plate mounting holes being provided with slots so as to securely grip the mounting screws.

Referring first to FIGS. 1 and 2 of the drawing, there is shown, in FIG. 1, the front or face of a meter 10 having a face plate 12 and an indicating means 14. Mounted on the face plate 12 is the scale plate 16. In one type of known application, the scale plate 16 will be a dual class scale plate which is reversible, provided with registering numerals on each side thereof. The scale plate 16 is held to the face of the meter by the mounting screws 18. In general, four mounting screws will be used. However, it will be understood that the number of mounting screws is in no way critical in the mounting of the scale plate.

The scale plate 16 is provided with mounting holes 20, as best shown in FIG. 2, each mounting hole being provided with a slot 22. Of course, it will be understood that the number of mounting holes will be equal to the number of mounting screws utilized, whether it is four or some other number. As shown, particularly in FIG. 2, the slots 22 extend from the edge of the mounting hole 20 to one edge of the scale plate 16. The scale plate 16, as shown in FIG. 1, is placed over the mounting screws 18, the mounting holes 20 firmly holding the mounting plate 16 to the mounting screws 18.

The means of securing the scale plate 16 to the mounting screws 18 is best shown by FIG. 3, to which reference will now be made. FIG. 3 shows the mounting screw 18 in its relation to the mounting hole 20 of the scale plate 16 and with relation to face plate 12. As is shown in FIG. 3, the mounting screw 18 has a shank 24 and a tapered head. The tapered head is formed of a straight sided base 26 and the upper sloped or tapered part 28. The mounting screw 18 is mounted in the face plate 12, which is provided with tapped holes 30. The threads in the tapped hole 30 are complementary with the threads on the shank 24 of the mounting screw 18. As can be seen, the mounting screw only has a one or two thread contact with face plate 12. This makes it very difficult to loosen screw 18, without removing it from tapped hole 30. By the novel mounting means herein set forth, it is not necessary to loosen or remove the mounting screws 18 to reverse or replace the scale plate 16.

In the manner indicated in FIG. 3, the scale plate 16 is pushed over the mounting screw 18, the mounting hole 20, sliding over the slope or tapered portion 28 and springing open by means of the slot 22. As the mounting hole slides over tapered portion 28, it is sprung sufficiently to fit over the straight sided portion 26. When the mounting hole slides over the straight side 26 of mounting screw 18 the springiness of the plate 16 causes the mounting hole 20 to firmly grip the straight side portion 26 of mounting screw 18, thus firmly securing the scale plate 16 on the face of the meter. Obviously, when it is desired to remove the scale plate 16 it is only necessary that it be grasped along its edges and lifted off the straight side portion 26 to remove it from the face of the meter.

From the above detailed description of a preferred embodiment of this invention, it will be obvious to those skilled in the art that a novel means is provided for mounting a scale plate onto a meter that does not require removal or loosening of the screws, and which will firmly and securely hold the scale plate on the face of the meter. While there has been shown and described the present preferred embodiment of this invention, it will be obvious to those skilled in the art that various changes may be made in the details thereof without departing from the spirit and scope of the invention as defined in the claims appended hereto.

What is claimed as new and which it is desired to secure by Letters Patent of the United States is:

1. A scale plate mounting means for an electrical meter comprising, in combination; a metering device having a face plate, a plurality of mounting screws secured to said face plate, each said mounting screw having a head comprising a straight base portion and a tapered top portion, a scale plate having indicia thereon for use with said metering device, said scale plate being provided with a plurality of mounting holes equal to said plurality of mounting screws, each of said mounting holes being provided with a slot extending from an edge of said mounting hole to an edge of said scale plate, each said slot cooperating with one of said mounting holes whereby said mounting holes are sprung open by said tapered portion of said mounting screws and firmly grip said straight base portion of said mounting screws to secure said scale plate to said meter face plate.

2. A scale plate for use with an electrical metering device comprising; a metallic plate having indicia thereon, a plurality of mounting holes in said plate, each of said plurality of mounting holes being provided with a slot extending from an edge of each of said mounting holes to an edge of said metallic plate, each said slot cooperating with one of said mounting holes to allow said mounting hole to be sprung open, whereby said metallic plate may be secured to screws having tapered heads fastened to an electrical metering device by pressing said plate mounting holes over the screws.

References Cited in the file of this patent
UNITED STATES PATENTS
1,250,174    Hill _____ Dec. 18, 1917